No. 697,366. Patented Apr. 8, 1902.
G. L. RIBAUD.
VACUUM PAN.
(Application filed Oct. 21, 1901.)
(No Model.) 2 Sheets—Sheet 1.
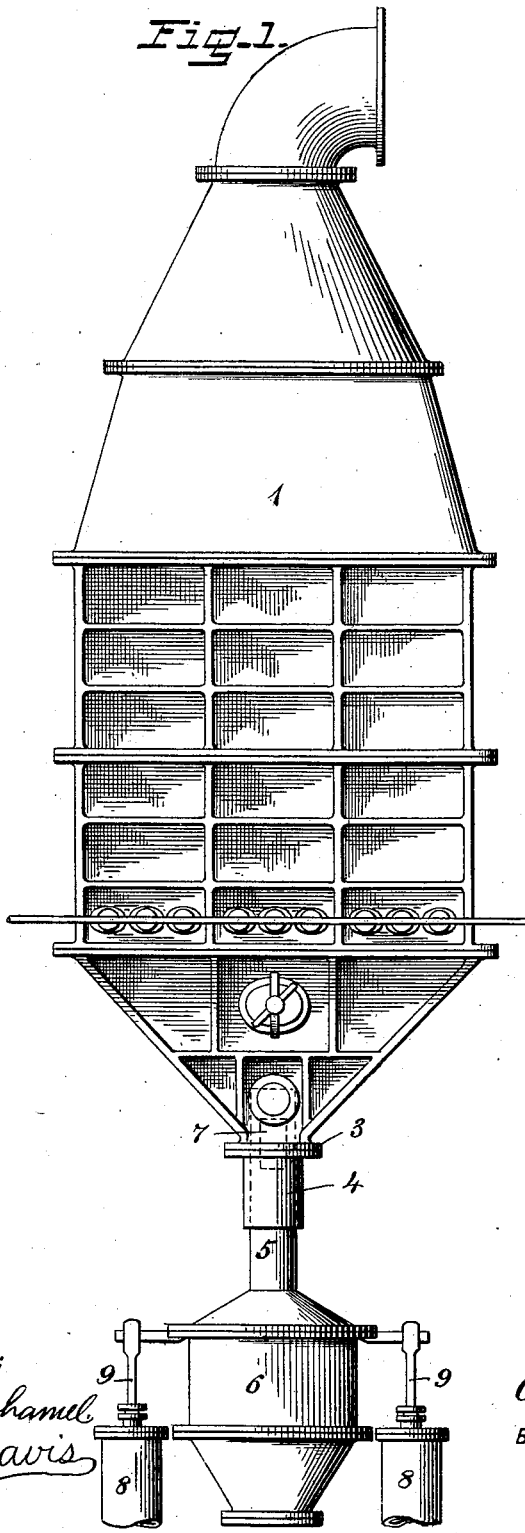
WITNESSES:
James F. Duhamel
A. H. C. Davis
INVENTOR
George L. Ribaud
BY Munn
ATTORNEYS
THE NORRIS PETERS CO., PHOTO-LITHO., WASHINGTON, D. C.

No. 697,366.  
G. L. RIBAUD.  
VACUUM PAN.  
(Application filed Oct. 21, 1901.)
Patented Apr. 8, 1902.
(No Model.)
2 Sheets—Sheet 2.
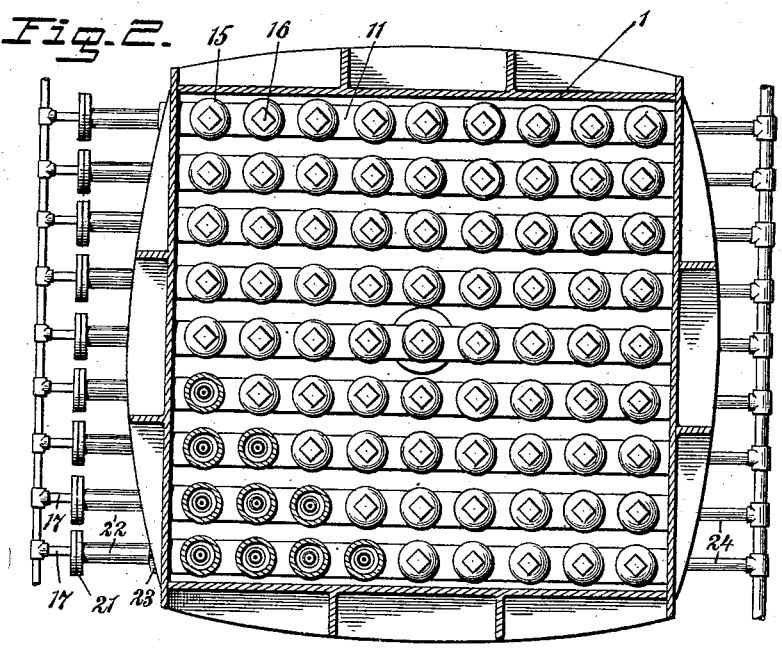
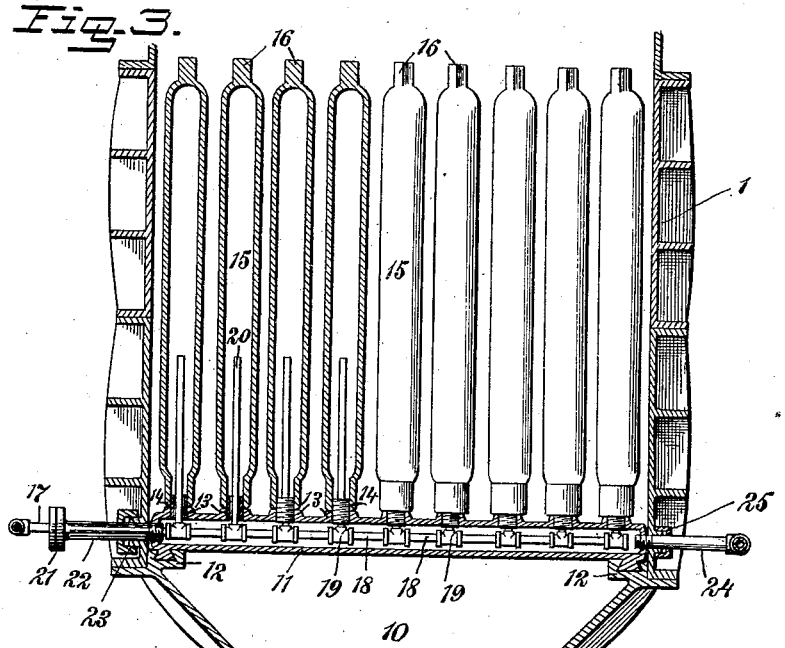
WITNESSES:
James F. Duhamel.
A. H. Davis.
INVENTOR
George L. Ribaud
BY
ATTORNEYS

UNITED STATES PATENT OFFICE.

GEORGE LOUIS RIBAUD, OF GRAND SALINE, TEXAS.

VACUUM-PAN.

SPECIFICATION forming part of Letters Patent No. 697,366, dated April 8, 1902.

Application filed October 21, 1901. Serial No. 79,380. (No model.)

*To all whom it may concern:*

Be it known that I, GEORGE LOUIS RIBAUD, a citizen of the United States, and a resident of Grand Saline, in the county of Van Zandt and State of Texas, have invented a new and Improved Vacuum-Pan, of which the following is a full, clear, and exact description.

My invention relates to vacuum-pans, and has for its object the production of a vacuum-pan having improved heating-sections and an improved form of discharge-chamber.

The drawings show one embodiment of my invention, and the claims define the actual scope thereof.

Reference is to be had to the accompanying drawings, forming a part of this specification, in which similar characters of reference indicate corresponding parts in all the figures.

Figure 1 is a side elevation of the vacuum-pan and discharge-chamber. Fig. 2 is a horizontal section through the vacuum-pan above the heating-sections; and Fig. 3 is a vertical section of the lower portion of the vacuum-pan, showing one of the heating-sections partly in section.

1 represents the vacuum-pan, whose walls are strengthened by vertical and transverse ribs, as shown. The pan tapers at the bottom to an orifice 2 and is flanged at 3 for securing thereto a brass-lined sleeve 4. Fitted within the sleeve 4 and extending through the orifice 2 is the neck 5 of the discharge-chamber 6. This neck is closed at the top, but is provided with apertures 7 in its sides, preferably three in number.

8 8 are cylinders provided with pistons 9 9, by means of which the discharge-chamber may be raised and lowered. It is evident that when the discharge-chamber is lowered the apertures 7 are drawn entirely within the sleeve 4 and the orifice 2 is entirely closed by the end of the neck 5.

In the operation of my device the salt or other substance is deposited in the space 10 at the bottom of the pan. When it is desired to remove the collected substance, the discharge-chamber is filled with a supply of brine or such liquor as is to be evaporated, and the chamber is then raised by any suitable means, as by the pistons 9 in the example shown. The apertures 7 are thereby brought into communication with the space 10 of the pan, and a transfer of the liquor to the pan and of the collected substance to the discharge-chamber takes place by the action of gravity. The discharge-chamber is then lowered, thereby closing the orifice 2 of the vacuum-pan. Should there be any tendency of the moist collected substance in the pan to arch over the orifice 2 and remain in the pan, it is evident that the rising of the neck 5 will break up such an arch.

From the foregoing description it will be understood that the upwardly-extending neck 5 of the discharge-chamber 6 is fitted slidably in the opening at the bottom of the pan, and when this discharge-chamber is moved in an upward direction the neck 5 thereof is adapted to extend above the said opening in the pan-bottom. The neck 5 is thus adapted to serve as a means for breaking the crust, which may form or arch over the opening in the bottom of the pan, and said neck may thus be properly termed the "crust-breaker."

My improved heating-sections each comprise a supporting-tube 11, which is dovetailed at each end to brackets 12 12, projecting from the walls of the pan. The tube 11 is provided with bosses 13, having threaded apertures in which nipples 14 are secured. The heating-tubes 15 are contracted at both ends, the lower ends being open and threaded upon the nipples 14 and the upper ends 16 being closed and squared to receive a wrench whereby they may be easily turned. The steam-pipes 17 are each composed of a number of short sections 18 and couplings 19, from which open branch pipes 20 extend into the heating-tubes 15, passing through the nipples 14, but leaving ample space surrounding the pipes 20 for the escape of the water of condensation and the exhaust-steam. The steam-pipes 17 are packed in the glands 21, secured to or integral with short tubes 22, which pass through the glands 23 on the walls of the vacuum-pan and are threaded in the ends of the tubes 11. The tubes 22 are of sufficient size to permit the withdrawal of the sections 18 and couplings 19 in case of repairs. The exhaust-pipes 24 pass through the glands 25 and are threaded into the ends of the tubes 11 opposite to the tubes 22.

Having thus described my invention, I claim as new and desire to secure by Letters Patent—

1. The combination with a vacuum-pan, of a transverse tube supported in the lower part thereof, a second tube passing through the wall of the pan and threaded into said first tube, a steam-pipe packed in the second tube and extending through the latter and into the first tube, said steam-pipe having separable sections which are united by couplings and said pipe being withdrawable from the pan through the second tube, a series of heating-tubes, branch pipes united by the couplings to the steam-pipe, and an exhaust-pipe communicating with the first tube.

2. In combination with a vacuum-pan having an outlet at its base, of a discharge-chamber having an upwardly-extending closed neck slidably fitted in said outlet and serving as a valved inclosure therefor and provided with an aperture in its side, and means for raising and lowering said chamber, whereby said neck acts as a valve for opening and closing said outlet.

3. A vacuum-pan provided with a series of inwardly-extending brackets having dovetail grooves therein, and a series of tubes supported thereby and having ribs engaging said grooves.

4. The combination with a vacuum-pan having an outlet at its base, of a discharge-chamber provided with an upwardly-extending neck, said neck of the chamber being slidably fitted in said outlet and adapted to serve as a means for breaking up crust therein and as a valved closure for said vacuum-pan, and means for raising said chamber.

5. The combination with a vacuum-pan having an outlet, of a discharge-chamber, means for extending from said discharge-chamber into said outlet and adapted to serve as a crust-breaker for matter which may solidify across the discharge-openings, and means for imparting movement to the crust-breaking means relative to the vacuum-pan.

In testimony whereof I have signed my name to this specification in the presence of two subscribing witnesses.

GEORGE LOUIS RIBAUD.

Witnesses:
T. M. RENEAU,
S. S. LONG.